United States Patent [19]
Fineberg

[11] Patent Number: 5,806,031
[45] Date of Patent: Sep. 8, 1998

[54] METHOD AND RECOGNIZER FOR RECOGNIZING TONAL ACOUSTIC SOUND SIGNALS

[75] Inventor: Adam B. Fineberg, Saratoga, Calif.

[73] Assignee: Motorola, Schaumburg, Ill.

[21] Appl. No.: 637,960

[22] Filed: Apr. 25, 1996

[51] Int. Cl.$^6$ ..................................................... G10L 9/00
[52] U.S. Cl. ......................................................... 704/254
[58] Field of Search ........................ 395/2.12, 2.16, 395/2.25, 2.26, 2.27, 2.63; 704/203, 207, 216, 217, 218, 237, 251, 254

[56] References Cited

U.S. PATENT DOCUMENTS 4,783,807  11/1988  Marley .................................... 395/2.63
5,625,749  4/1997  Goldenthal et al. .................... 395/2.63

OTHER PUBLICATIONS

Kroon, Peter et al., "Pitch Predictors with High Temporal Resolution", Proceedings IEEE 1990 International Conference on *Acoustics, Speech, and Signal Processing*, Apr. 3–6, 1990.

Rabiner, Lawrence R. et al., "A Comparative Performance Study of Several Pitch Detection Algorithms" Reprinted from IEEE Trans. Acoust., Speech, and Signal Process., vol. ASSP–24, pp. 399–417, Oct. 1976.

*Primary Examiner*—David R. Hudspeth
*Assistant Examiner*—Susan Wieland
*Attorney, Agent, or Firm*—Hugh C. Dunlop

[57] ABSTRACT

A tonal sound recognizer determines tones in a tonal language without the use of voicing recognizers or peak picking rules. The tonal sound recognizer computes feature vectors for a number of segments of a sampled tonal sound signal in a feature vector computing device, compares the feature vectors of a first of the segments with the feature vectors of another segment in a cross-correlator to determine a trend of a movement of a tone of the sampled tonal sound signal, and uses the trend as an input to a word recognizer to determine a word or part of a word of the sampled tonal sound signal.

22 Claims, 1 Drawing Sheet

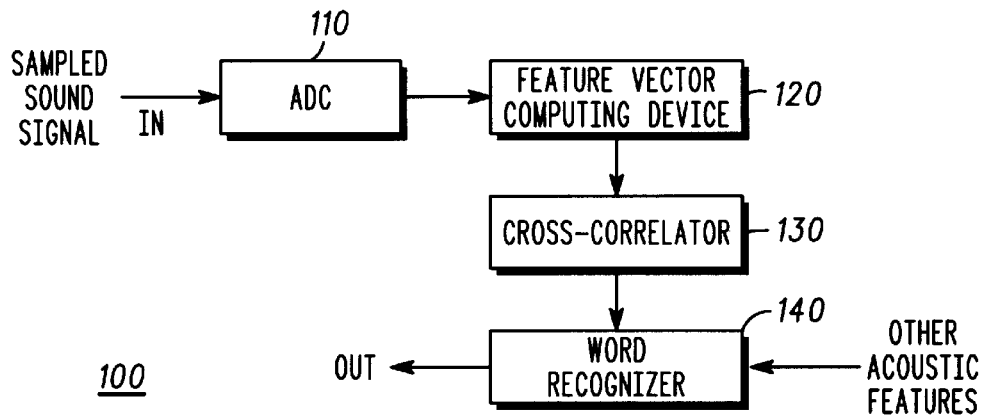
FIG.1
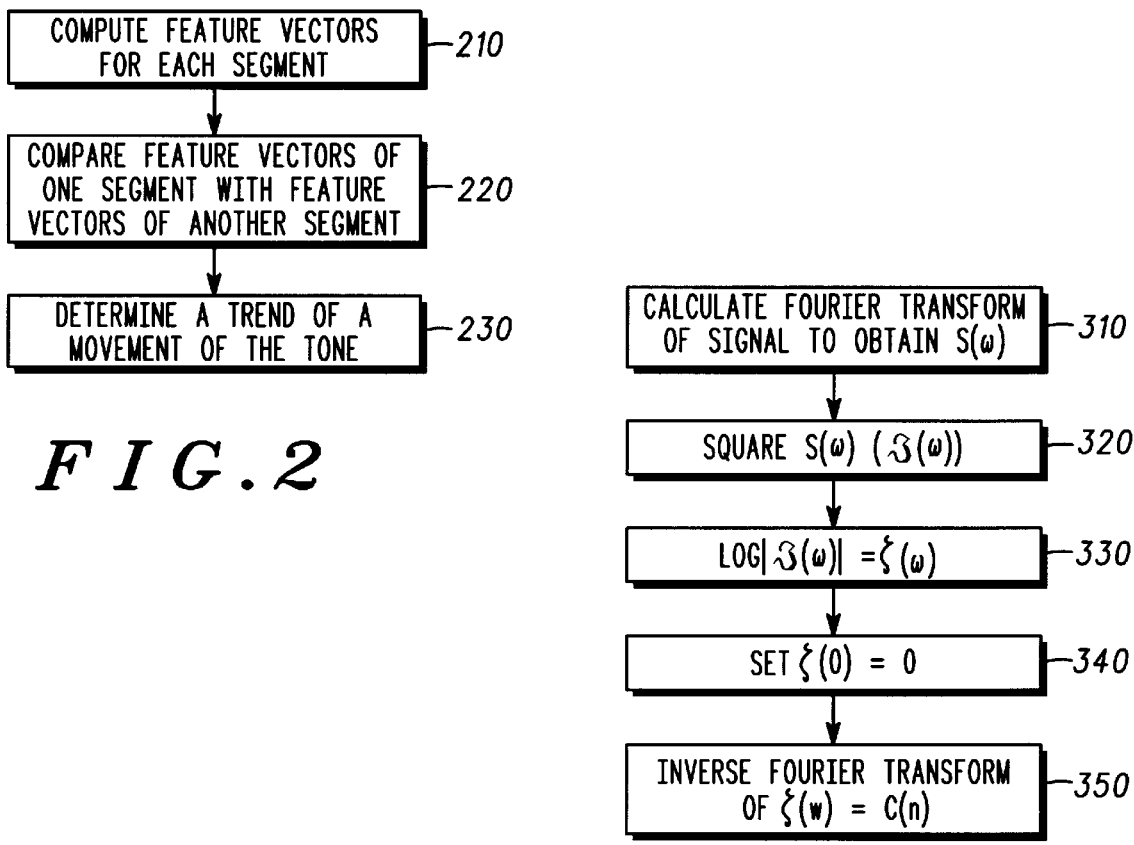
FIG.2
FIG.3

5,806,031

METHOD AND RECOGNIZER FOR RECOGNIZING TONAL ACOUSTIC SOUND SIGNALS

FIELD OF THE INVENTION

The present invention relates, in general, to sound recognition, and in particular, to sound recognition of tonal acoustic sound signals.

BACKGROUND OF THE INVENTION

In the complex technology of speech recognition, one of the most complex and difficult challenges is to recognize sounds spoken in a language having tonal fluctuations and voiced/unvoiced sounds. In languages such as Latin or Germanic based languages or Japanese, tones are not a problem. These languages may be spoken in a monotone voice, and although the effect is uninteresting, the meaning is the same as if inflexion was added. This is not the case in tonal languages such as Chinese.

Mandarin Chinese is generally understood to have 5 tones. A first tone is monotone, a second rises, a third falls for a short time then rises, and a fourth falls. The length of the tones vary with the first usually being the longest, the second and third tones are usually similar in length of time, and the fourth is generally the shortest. The fifth tone, although not actually a tone, is neutral and is used on some syllables that are suffix to words.

As with nearly all languages, Mandarin uses voiced and unvoiced sounds. A voiced sound is one generated by the vocal cords opening and closing at a constant rate giving off pulses of air. The distance between the peaks of the pulses is known as the pitch period. An example of voiced sounds would be an "i" sound as found in the word "pill". An unvoiced sound is one generated by a single rush of air which results in turbulent air flow. Unvoiced sounds have no defined pitch. An example of an unvoiced sound is the "p" sound as found in the word "pill". A combination of voiced and unvoiced sounds can also be found in the word "pill" as the "p" requires the single rush of air while the "ill" requires a series of air pulses.

Although essentially all languages use voiced and unvoiced sounds, recognition of tonal languages are particularly difficult because the tone occurs only on the voiced segments of the words.

Speech recognition for tonal languages such as Mandarin in conventional speech recognizers usually attempt to estimate pitch frequency. First, the speech recognizer must determine if the sound was voiced or unvoiced. This is performed using a voicing detector. Unfortunately, detecting voicing is very difficult and the process is prone to error. Even if the voicing is decided correctly, the recognizer must next estimate the pitch frequency to determine tone using a pitch estimator. Conventional pitch estimators generally use a process based upon auto-correlation, although other methods are used such as auto-regression methods.

Auto correlation is essentially the matching of peaks in a sampled signal such as a sound signal. A sampled digital speech signal is divided into segments. The auto correlation method then compares the sampled speech signal for each segment with the sampled speech signal over all values of t for the same segment at time t−τ for negative, positive and zero values of τ, where τ is a time lag. For τ=0, the signal will be compared with itself providing a measure of signal power. The auto correlation function has a peak value at τ when the signal at time t aligns well with the signal at time t−τ. The equation for auto correlation is:

$$R_{xx}(\tau) = \Sigma x_i(t)\, x_i(t-\tau)$$

where $R_{xx}(\tau)$ is the auto correlation at a lag τ, $x_i(t)$ is the speech signal at a segment "i" and time "t", $x_i(t-\tau)$ is the speech signal segment "i" and time (t−τ) (a version of $x_i(t)$ delayed by τ samples), and Σ is the summation over a range of times at a given lag τ.

After the auto correlation has established peak values indicating alignment between the sampled signal at t and the sampled signal at (t−τ) for the same segment, one of the peaks is selected as a potential pitch frequency and predetermined or established constraints are used to decide if the chosen peak corresponds to a pitch frequency. Often a peak is selected as a potential frequency by sorting the peak values from the auto correlation process from lowest to highest and picking the highest value. The criteria for determining if this potential peak value is the correct pitch frequency is if the peak value is reasonable given the established constraints. These constraints will always vary but generally include whether the frequency of the peak is reasonably in the range known to be produced by human speech and whether the frequency of the peak is reasonable given previous pitch frequencies.

This process of defining rules and constraints is known as a heuristic method of analysis. Unfortunately, a heuristic method when applied to pitch frequency estimation is prone to error. For instance, the process may not distinguish between an actual peak and a harmonic. Additionally, there is never a clear definition of what a good rule is, and those rules that are established generally do not apply in all circumstances.

An example of a voiced tonal sound signal would be the syllable Ta3 representing the pronunciation of the letters "ta" with tone 3 mentioned above. Ta3 has both voice and unvoiced sounds as well as a moving tone. Part of Ta3 has pitch and part does not. To adequately analyze Ta3, many rules must be generated which would have any number of exceptions to the rules.

The complex sets of changing rules result in high probabilities of error. Coupled with a requirement to determine properly whether a syllable is voiced or unvoiced, the conventional tonal sound recognizers cannot supply a high degree of accuracy in a reasonable manner. Additionally, tone is only one input to a sound recognizer that recognizes words or phrases from the input voiced tonal sound signal. Each of the inputs has a probability of error, greater or smaller. As each of these inputs bring error into the process, the probability of accuracy drops. Therefore, it is necessary to increase the probability of accuracy of the tonal recognition in order to help increase the probability of accuracy in the sound recognizer.

BRIEF DESCRIPTION OF THE DRAWINGS

FIG. 1 is a block diagram of a tonal sound recognizer according to a preferred embodiment of the present invention.

FIG. 2 is a flow diagram of the tonal sound recognizer of FIG. 1 in accordance with the preferred embodiment of the present invention.

FIG. 3 is a flow diagram of the calculation of feature vectors according to a preferred embodiment of the present invention.

DETAILED DESCRIPTION OF THE INVENTION

Key to building a tonal sound recognizer that increases the probability of accuracy is eliminating voicing recognizers and eliminating the need for determining pitch frequency. To do this, there must be a way to compute tone trends for all sounds, voiced and unvoiced. Additionally, peak picking must be avoided thus eliminating the need for the complex and cumbersome peak picking rules.

The present invention eliminates the voicing recognizer and the complex sets of rules of conventional tonal recognizers by tracking the trend, or movement, of the tone to determine if it is rising, falling, constant, or some combination of these. The trend is determined from segment to segment of the sampled sound signal.

FIG. 1 shows a tonal sound recognizer 100 according to the present invention. Referencing also the flow chart of FIG. 2 showing the basic operation of the present invention, tonal sound recognizer 100 receives a sampled sound signal in analog form and converts the sampled sound signal into a digital signal in ADC 110. The digital sampled sound signal is then sent to feature vector computing device 120 where the sampled sound signal is segmented into a number of segments, preferably into segments equal in width, for analysis. Feature vectors for each segment of the sampled sound signal are computed (210 of FIG. 2) in feature vector computing device 120. The feature vectors are vectors containing information that describes the tone trend of the sampled sound signal.

In the preferred embodiment of the present invention, each segment is an analysis frame where a sampled signal is divided into any number of analysis frames. These analysis frames may overlap, be joined end-to-end, or be spaced apart, depending upon the needs of the design. In the preferred embodiment, the analysis frames overlap.

Each of the analysis frames are multiplied by samples of a window function or weighting function. Any window function may be applied. In the preferred embodiment, the values of the hamming window are described by $$w_{i_{ndex}} = 0.54 - 0.46\cos\left(\frac{2\pi i_{ndex}}{l_{window}-1}\right)$$

where $w_{i_{ndex}}$ is the window function at sample index "$i_{ndex}$" and "$l_{window}$" is the length of the window.

In the preferred embodiment, the feature vectors for each analysis frames are Cepstral vectors or Cepstral coefficients. To obtain the Cepstral coefficients of an analysis frame, with reference to FIG. 3, the Fourier transform of the sampled sound signal in an analysis frame (s(t)) is calculated (310) to yield the spectrum (s(ω)) of the sampled sound signal in the analysis frame. The spectrum is then squared (3201) yielding the power spectrum ($\Im(\omega)$)) and the log of the power spectrum is calculated ($\zeta(\omega)$)) (330). At this point, $\zeta(0)$ (frequency equals zero) is set to zero, or $\zeta(0)=0$ (340). The zero element of the power spectrum is a measure of the DC energy in the signal and carries no information related to tone. Therefore, $\zeta(0)$ is eliminated from the analysis.

After eliminating $\zeta(0)$ from the analysis, the inverse Fourier transform is calculated for $\zeta(\omega)$ (350) to obtain the Cepstral coefficients or Cepstral vector C(n).

Referring again to FIG. 1, the feature vectors calculated in feature vector computing device 120 are sent to cross-correlator 130. Cross-correlator 130 compares the feature vectors in any one of the segments (a first) with the feature vectors of the next segment (a second) in time to determine if the tone of the sampled tonal sound signal is moving up, down, staying constant, or some combination of the three (220 of FIG. 2) between the segments. For instance, the feature vectors of a first segment would be compared with the feature vectors of a second segment to determine the direction of movement between the segments over time. The process of comparing feature vectors in different segments is known as the cross-correlation method and is defined by the equation:

$$R_{xyi}(\tau) = \Sigma FV_i(t)\ FV_{(i+1)}(t-\tau)$$

where $R_{xyi}(\tau)$ is the cross-correlation value $R_{xy}$ at one of the number of segments "i" for a sampled tonal sound signal at a lag "$\tau$", $FV_i(t)$ is one of the feature vectors at the "$i^{th}$" one of the number of segments and at time "t", $FV_{(i+1)}(t-\tau)$ is one of the feature vectors at the "i+1" one of the number of segments and at time t–τ, and Σ is a summation of $FV_i(t)$ $FV_{(i+1)}(t-\tau)$ for a range of values of "t". The range is determined to be that range generally recognized to contain tonal trend information.

The lag "$\tau$" is a shift in time in either direction from time "t" of the analyzed segment.

The cross-correlation method defines peaks which correlate from segment to segment. These peaks are conceptually plotted segment by segment, or in other words, the correlated peaks of the segments are lined up over time. The position of the peaks in the segments will define the direction the tone of the sampled tonal sound signal is moving. For instance, if correlating peaks from a first segment to a second segment are moving to the right, the tone of the sample tonal sound signal is moving up. If the peaks from segment to segment are moving left, the tone is moving down. If the peaks are generally in the same location from segment to segment, the tone is staying the same. Cross-correlator 130 tracks a trend of movement of the tone (230 of FIG. 2). Using the Mandarin tones as an example, a sampled tonal sound signal having peaks moving to the right would define a second tone as discussed previously. Movement to the left for a short time and then back to the right would define the third tone discussed earlier. No movement, or insignificant movement would define the first tone, whereas movement only to the left over time would define the fourth previously discussed tone.

The trend of the tone is an element used by a word recognizer such as word recognizer 140 to recognize a word or syllable. Word recognizer 140, according to the preferred embodiment of the present invention, recognizes sounds or words in a tonal language using the tone trend as one input with other acoustic features to the recognition process. Word recognizer 140 then determines a word or part of a word using the input information.

There is no recognizable trend in tone in unvoiced segments of a tonal language over time. Instead, any tone pattern will be randomly moving about. Word recognizer 140 can identify random movement and will categorize the segments having random movement as unvoiced segments.

By computing feature vectors for a sampled tonal sound signal, such as Cepstral vectors, and comparing these feature vectors across segments of the sample tonal sound signal over time, the movement of the tone may be determined which defines a tone trend. The tone trend is then used in place of the prior art combination of a voicing recognizer and a complex set of peak picking rules as an input to the recognition process.

The process of the present invention as described above may be stored on an article of manufacture such as a computer diskette or on a storage medium of a computer to allow the computer to access and perform the method of the preferred embodiment of the present invention.

It should be recognized that the present invention may be used in many different sound recognition systems. All such varied uses are contemplated by the present invention.

What is claimed is:

1. A method of processing speech for recognition comprising:

sampling a tonal sound signal;

computing feature vectors for a number of segments of a sampled tonal sound signal wherein the feature vectors contain information describing a tonal trend of the sampled tonal sound signal;

comparing the feature vectors of a first of the number of segments with the feature vectors of a second of the number of segments to determine a trend of a movement of a tone of the sampled tonal sound signal; and using the trend as an input to a recognizer to determine a word or part of a word of the sampled tonal sound signal.

2. A method according to claim 1 wherein the step of comparing the feature vectors of a first of the number of segments with the feature vectors of a second of the number of segments is a cross-correlation method.

3. A method according to claim 2 wherein the cross-correlation method uses an equation:

$$R_{xyi}(\tau) = \Sigma FV_i(t) \, FV_{(i+1)}(t-\tau)$$

where $R_{xyi}(\tau)$ is a cross-correlation value $R_{xy}$ at one of the number of segments "i" for a sampled tonal sound signal at lag "$\tau$", $FV_i(t)$ is one of the feature vectors at an "$i^{th}$" one of the number of segments at time "t", $FV_{(i+1)}(t-\tau)$ is one of the feature vectors at an "i+1" one of the number of segments at time t−τ, and $\Sigma$ is a summation of $FV_i(t) \, FV_{(i+1)}(t-\tau)$ for values of "t".

4. A method according to claim 1 wherein the step of computing feature vectors for a number of segments of a sampled tonal sound signal comprises computing Cepstral vectors for each of the number of segments.

5. A method according to claim 4 wherein the step of computing Cepstral vectors for each of the number of segments comprises the steps of:

calculating a Fourier transform of the sampled tonal sound signal to obtain a spectrum and squaring the spectrum to obtain a power spectrum;

calculating a log of the power spectrum; and calculating an inverse Fourier transform of the power spectrum to obtain the Cepstral vectors for each of the number of segments.

6. A method according to claim 5 wherein the step of calculating a log of the power spectrum further includes setting the log of the power spectrum at a frequency of zero to equal zero.

7. An article of manufacture comprising a computer storage medium having stored thereon instructions and data which cause a computing device to perform the steps of:

computing feature vectors for a number of segments of a sampled tonal sound signal wherein the feature vectors contain information describing a tonal trend of the sampled tonal sound signal;

comparing the feature vectors of a first of the number of segments with the feature vectors of a second of the number of segments to determine a trend of a movement of a tone of the sampled tonal sound signal; and using the trend as an input to determine a word or part of a word of the sampled tonal sound signal.

8. An article of manufacture according to claim 7 wherein the step of compare the feature vectors of a first of the number of segments with the feature vectors of a second of the number of segments is a cross-correlation method.

9. An article of manufacture according to claim 8 wherein the cross-correlation method uses an equation:

$$R_{xyi}(\tau) = \Sigma FV_i(t) \, FV_{(i+1)}(t-\tau)$$

where $R_{xyi}(\tau)$ is a cross-correlation value $R_{xy}$ at one of the number of segments "i" for a sampled tonal sound signal at lag "$\tau$", $FV_i(t)$ is one of the feature vectors at an "$i^{th}$" one of the number of segments at time "t", $FV_{(i+1)}(t-\tau)$ is one of the feature vectors at an "i+1" one of the number of segments at time t−τ, and $\Sigma$ is a summation of $FV_i(t) \, FV_{(i+1)}(t-\tau)$ for values of "t".

10. A method according to claim 7 wherein the step of compute feature vectors for a number of segments of a sampled tonal sound signal comprises computing Cepstral vectors for each of the number of segments.

11. A method according to claim 10 wherein the step of computing Cepstral vectors for each of the number of segments comprises the steps of:

calculating a Fourier transform of the sampled tonal sound signal to obtain a spectrum and squaring the spectrum to obtain a power spectrum;

calculating a log of the power spectrum; and calculating an inverse Fourier transform of the power spectrum to obtain the Cepstral vectors for each of the number of segments.

12. A method according to claim 11 wherein the step of calculating a log of the power spectrum further includes setting the log of the power spectrum at a frequency of zero to equal zero.

13. A device comprising:

an analog-to-digital converter providing a sampled tonal sound signal;

a feature vector computing device for computing feature vectors for a number of segments of a sampled tonal sound signal;

a cross-correlator for comparing the feature vectors of a first of the number of segments with the feature vectors of a second of the number of segments to determine a trend of a movement of a tone of the sampled tonal sound signal; and a word recognizer for using the trend as an input to determine a word or part of a word of the sampled tonal sound signal.

14. A method comprising, in a computing device:

computing feature vectors for a number of segments of a sampled tonal sound signal wherein the feature vectors contain information describing a tonal trend of the sampled tonal sound signal;

comparing the feature vectors of a first of the number of segments with the feature vectors of a second of the number of segments through a cross-correlation method to determine a trend of a movement of a tone of the sampled tonal sound signal; and using the trend as an input to determine a word or part of a word of the sampled tonal sound signal.

15. A method according to claim 14 wherein the cross-correlation method uses an equation:

$$R_{xyi}(\tau) = \Sigma FV_i(t) \, FV_{(i+1)}(t-\tau)$$

where $R_{xyi}(\tau)$ is a cross-correlation value $R_{xy}$ at one of the number of segments "i" for a sampled tonal sound signal at lag "$\tau$", $FV_i(t)$ is one of the feature vectors at an "$i^{th}$" one of the number of segments at time "t", $FV_{(i+1)}(t-\tau)$ is one of the feature vectors at an "i+1" one of the number of segments at time t−τ, and Σ is a summation of $FV_i(t)\ FV_{(i+1)}(t-\tau)$ for values of "t".

16. A method according to claim 14 wherein the step of computing feature vectors for a number of segments of a sampled tonal sound signal comprises computing Cepstral vectors for each of the number of segments.

17. A method according to claim 16 wherein the step of computing Cepstral vectors for each of the number of segments comprises the steps of:

calculating a Fourier transform of the sampled tonal sound signal to obtain a spectrum and squaring the spectrum to obtain a power spectrum;

calculating a log of the power spectrum; and calculating an inverse Fourier transform of the power spectrum to obtain the Cepstral vectors for each of the number of segments.

18. A method according to claim 17 wherein the step of calculating a log of the power spectrum further includes setting the log of the power spectrum at a frequency of zero to equal zero.

19. A method comprising, in a computing device:

computing Cepstral vectors for a number of segments of a sampled tonal sound signal wherein the Cepstral vectors contain information describing a tonal trend of the sampled tonal sound signal;

comparing the Cepstral vectors of a first of the number of segments with the Cepstral vectors of a second of the number of segments through a cross-correlation method to determine a trend of a movement of a tone of the sampled tonal sound signal; and using the trend as an input to determine a word or part of a word of the sampled tonal sound signal.

20. A method according to claim 19 wherein the cross-correlation method uses an equation:

$$R_{xyi}(\tau) = \Sigma FV_i(t)\ FV_{(i+1)}(t-\tau)$$

where $R_{xyi}(\tau)$ is a cross-correlation value $R_{xy}$ at one of the number of segments "i" for a sampled tonal sound signal at lag "τ", $FV_i(t)$ is one of the Cepstral vectors at an "$i^{th}$" one of the number of segments at time "t", $FV_{(i+1)}(t-\tau)$ is one of the Cepstral vectors at an "i+1" one of the number of segments at time t−τ, and Σ is a summation of $FV_i(t)\ FV_{(i+1)}(t-\tau)$ for values of "t".

21. A method according to claim 19 wherein the step of computing Cepstral vectors for each of the number of segments comprises the steps of:

calculating a Fourier transform of the sampled tonal sound signal to obtain a spectrum and squaring the spectrum to obtain a power spectrum;

calculating a log of the power spectrum; and calculating an inverse Fourier transform of the power spectrum to obtain the Cepstral vectors for each of the number of segments.

22. A method according to claim 21 wherein the step of calculating a log of the power spectrum further includes setting the log of the power spectrum at a frequency of zero to equal zero.

* * * * *